(12) United States Patent
Dietachmayr

(10) Patent No.: US 7,017,504 B2
(45) Date of Patent: Mar. 28, 2006

(54) METHOD FOR CUTTING OUT A CUTTING FROM A WEB OF ENDLESS TEXTILE FABRIC FOR PRODUCING WORKPIECES FROM A FIBER/PLASTIC COMPOSITE

(75) Inventor: Harald Dietachmayr, Sierning (AT)

(73) Assignee: GFM Beteiligungs- und Management GmbH & Co. KG, Steyr (AT)

( * ) Notice: Subject to any disclaimer, the term of this patent is extended or adjusted under 35 U.S.C. 154(b) by 209 days.

(21) Appl. No.: 10/674,663

(22) Filed: Sep. 30, 2003

(65) Prior Publication Data
US 2004/0060495 A1 Apr. 1, 2004

(30) Foreign Application Priority Data
Oct. 1, 2002 (AT) ............... GM649/2002

(51) Int. Cl.
*D05B 35/00* (2006.01)
*D05B 37/00* (2006.01)
(52) U.S. Cl. ............... 112/475.01; 112/475.08
(58) Field of Classification Search ........... 112/475.01, 112/475.07, 475.08, 303, 304, 307, 319, 470.12, 112/470.13, 470.27, 129; 2/275; 83/13, 83/29, 56, 155, 936, 939; 156/93; 198/631.1, 198/783, 832.1
See application file for complete search history.

(56) References Cited

U.S. PATENT DOCUMENTS

| | | | | |
|---|---|---|---|---|
| 3,366,974 A | * | 2/1968 | Gwynn | 2/106 |
| 3,896,749 A | * | 7/1975 | Brauns et al. | 112/470.06 |
| 3,901,173 A | * | 8/1975 | Ellington et al. | 112/475.06 |
| 4,832,408 A | * | 5/1989 | Bertsch et al. | 297/452.36 |
| 4,867,085 A | | 9/1989 | Brace et al. | |
| 5,042,338 A | * | 8/1991 | Gerber | 83/34 |
| 5,216,614 A | * | 6/1993 | Kuchta et al. | 700/134 |
| 5,250,138 A | * | 10/1993 | Szewczyk et al. | 156/350 |
| 5,277,736 A | * | 1/1994 | Logan | 156/247 |

FOREIGN PATENT DOCUMENTS

| | | |
|---|---|---|
| DE | 3801820 A1 | 11/1988 |
| DE | 199 52 443 A 1 | 5/2001 |

* cited by examiner

Primary Examiner—Ismael Izaguirre
(74) Attorney, Agent, or Firm—Collard & Roe, P.C.

(57) ABSTRACT

A method for cutting out a cutting (13) from a web (1) of endless textile fabric for producing workpieces from a fiber/plastic composite is described, with the web (1) of endless fabric made up of fiber strands (2, 3) being stitched at first according to the course (14) of the edge of the cutting (13) to be cut out before the cutting (13) is cut out from the web (1) of endless fabric. In order to provide advantageous process conditions it is proposed that the web (1) of endless fabric which can be conveyed step by step in a predetermined conveying direction (10) in longitudinal sections (6) concerning the conveying direction is stitched in sections exclusively within the cutting region on the one hand and is cut on the other hand and is conveyed further by a conveying step according to the section length after each sectional sewing and cutting process.

3 Claims, 1 Drawing Sheet

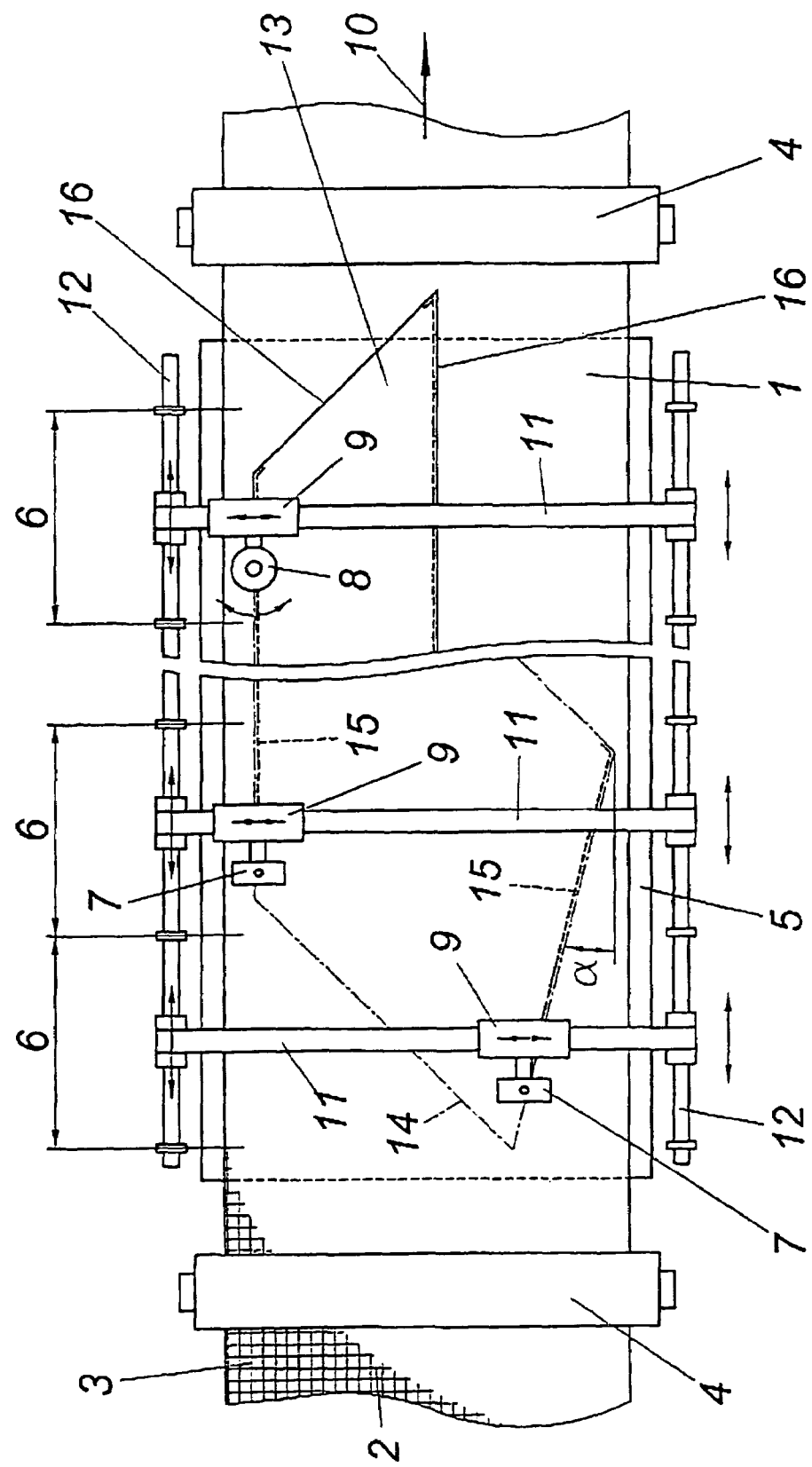

METHOD FOR CUTTING OUT A CUTTING FROM A WEB OF ENDLESS TEXTILE FABRIC FOR PRODUCING WORKPIECES FROM A FIBER/PLASTIC COMPOSITE

FIELD OF THE INVENTION

The invention relates to a method for cutting out a cutting from a web of endless textile fabric made of a fiber/plastic composite, with the web of endless fabric made up of fiber strands being stitched at first according to the course of the edge of the cutting to be cut out before the cutting is cut out from the web of endless fabric.

DESCRIPTION OF THE PRIOR ART

Workpieces are composed of a fiber/plastic composite in layers from the cuttings corresponding to the workpiece geometry, which cuttings are cut out from the webs of endless textile fabric of the fibers to be used accordingly. Said webs of endless fabric are made up of strands of fibers in the form of woven fabrics for example. As a result of the structure of the woven fabrics, the cuttings tend to fray at the edges. The fibers or fiber strands lost from the edge region of the cuttings during their handling lead to a reduction in the strength in the edge regions of the workpieces made up of such cuttings, so that the cuttings are cut out from the respective webs of endless fabric with an overmeasure, which requires laborious subsequent processing of the workpiece edges after the resin impregnation of the cuttings. In order to avoid such disadvantages and to allow a precise cut-out of the cuttings with the final dimensions it has already been proposed (DE 199 52 443 A1) to stitch the web of endless fabric at first with a multiple stitched seam according to the course of the edge of the cutting to be cut out in order to allow cutting out the cutting between two seams in a dimensionally precise manner. By setting multiple stitched seams, the fibers of the fiber strands are fixed on both sides of the cutting region as a precondition for cutting out the cutting in a manner precisely to match the shape. At the same time, the fraying of the edge regions of the cutting is prevented. The disadvantageous aspect is, however, that the setting of multiple stitched seams means additional work, not only by providing a sewing head with at least two needles, but also by the resulting necessity of having to align the sewing head additionally relative to the edge process of the cutting so that the needles pierce the web on both sides of the edge progress of the cutting. An additional factor is that in the case of cuttings of a larger surface area it is necessary to have comparatively large tables for guiding the web of endless fabric.

For stitching and cutting upholstered parts it is also known (DE 3801820 A1) to stitch the non-woven web used for producing the upholstered parts along the contour of the respective cuttings and to stitch the same within the taken-up region before the upholstered parts are cut out, this being done in such a way that the seam following the contour of the respective cutting is scanned for guiding the cutting device. Since in contrast to webs of endless fabrics which are made up of fiber strands there is no fraying of the cut web in the case of non-woven materials for producing upholstered parts, cutting conditions occur in the production of such upholstered parts which are not comparable. Moreover, the problem concerning the size of the table that needs to be adjusted to the maximum size of cutting still remains.

SUMMARY OF THE INVENTION

The invention is thus based on the object of providing a method for cutting out a cutting from a web of a textile endless fabric of the kind mentioned above in such way that not only the stitching work can be reduced without any impairment to the cutting precision of the cuttings or concerning the fraying behavior, but also that a substantial independence from the size of the table relative to the size of the cutting is achieved.

This object is achieved by the invention in such a way that the web of endless fabric which can be conveyed step by step in a predetermined conveying direction in longitudinal sections concerning the conveying direction is stitched in sections exclusively within the cutting region on the one hand and is cut on the other hand and is conveyed further by a conveying step according to the section length after each sectional sewing and cutting process.

When the web of endless fabric which can be conveyed in a predetermined conveying direction in steps is moved in longitudinal sections concerning the conveying direction, then this leads to the advantage that the length of the cutting in the conveying direction of the web can be chosen independently from the device for sewing or cutting of the web which is limited to a longitudinal section. After the processing in sections, the web needs to be conveyed further by a conveying step corresponding to the section length in order to enable the continuation of the processing in a further working step.

It has also been seen that no multiple stitched seam is required for dimensionally precise cutting of a cutting from a web made up of fiber strands, so that the web merely needs to be stitched within the cutting region according to the progress of the edge of the cutting to be cut out in order to prevent any fraying of the cutting edges of the cutting. It needs to be ensured however that the web is clamped down during the cutting by a holding-down clamp, preferably by at least one pressing roller which has an axis extending transversally to the cutting direction and being inclined relative to the workpiece support in order to enable keeping the web as close as possible to the cutting tool via the pressing roller. Especially advantageous conditions for the method are obtained as a result of the combination of the processing the web in sections by limiting the taking up within the cutting region.

To ensure that differences concerning the sewing and the cutting advancement can be taken into account in the processing in sections of the web, it is recommended to stitch and cut the web in different longitudinal sections. Moreover, it is advantageous for the purpose of adjustment of the higher cutting speed to the lower sewing speed when the web is stitched in different longitudinal sections associated with one sewing head each with the help of at least two sewing heads and for the purpose of mutually independent control of said sewing heads, so that the full cutting speed can be utilized in a further longitudinal section for cutting out the cuttings which are stitched at least in sections.

Since the multiple stitched seam is no longer required for fixing the fibers of the fiber strands according to the cutting, the single stitched seam is used mainly to prevent the fraying of the cutting in the edge region. In addition to the structure of the web, the inclination towards fraying of a cutting edge depends especially on the progress of the cutting edge relative to the progress of the fiber strands, i.e. in the case of a fabric on the progress of the weft and warp. The smaller the angle between the edge progress of the cutting and the progress of the fiber strands, the higher the tendency towards fraying. This fact can be used advantageously to minimize the amount of sewing work when the web is merely stitched in such sections of the edge progress of the cutting to be cut out in which the edge progress forms a corner or encloses an angle smaller than 30° with fiber strands at the edge.

BRIEF DESCRIPTION OF THE DRAWING

The method in accordance with the invention is explained in closer detail by reference to the enclosed drawing. It shows an apparatus for stitching and cutting out a cutting from a web of an endless fabric in a schematic top view.

DESCRIPTION OF THE PREFERRED EMBODIMENT

The web 1 whose fiber strands 2 and 3 extend in the manner of weft and warp threads of a fabric and consist of carbon fibers for example is pulled with the help of conveying rollers 4 of a conveying device over a work table 5 which is associated in successive longitudinal sections 6 with sewing heads 7 on the one hand and a cutting device 8 on the other hand. Both the sewing heads 7 as well as the cutting device 8 are displaceably held on carriages 9 transversely to the direction of advance 10 of the web 1, with the carriage guiding means 11 being themselves displaceable on guide rails 12 in the direction of advance 10, so that the sewing heads 7 and the cutting device 8 can each be moved in the region of the individual longitudinal sections 6 in a random way over the surface of the web. For the purpose of controlling these sewing and cutting movements there are conventional cutting devices which are triggered via the drives for the carriages 9 and the carriage guide means 11 according to the respective edge progress of a cutting 13 to be cut out from the web 1. The cutting 13 is stitched by a single stitched seam along its edge, namely on the side of the cutting 13, i.e. within the cutting region. In order to illustrate the shape of the later cutting 13, the edge progress 14 is indicated in a dot-dash line in the region not yet cut.

Since the sewing advance is lower than the cutting speed, two sewing heads but only one cutting device 8 is used, so that the full cutting speed can be used despite the differences in respect of the processing speeds. The two sewing heads 7, which can each be moved independent from one another in the own longitudinal sections 6 like the cutting device 8, sew the respective edge seams 15 in their longitudinal section 6 when the web 1 is stationary, because they are conveyed further after setting the edge seams 15 in the associated section 6 by a conveying step corresponding to the section length. This occurs in order to continue the edge seam 15 along the edge progress 14 on the one hand and in order to cut out the stitched regions with the help of the cutting device 8 on the other hand. The cutting edges obtained by the cutting are designated with reference numeral 16. Said cuffing edges 16 are also cut in sections according to the stepwise conveyance of the web 1. For this purpose the cutting device 8 is moved along the edge progress 14. The web 1 is pressed at least outside of the edge progress 14 on the working table 5 in a manner adjusted to the cutting by means of pressing rollers which are not shown and are situated on the side adjacent to the blades in order to ensure a dimensionally accurate cutting of the web 1 without any drafting.

Since the inclination towards fraying of the cutting edges 16 depends not only on the structure of the web 1 but also on the progress of the edge 14 relative to the progress of the fiber strands 2, 3, the cutting 13 need not be stitched along its entire circumference. The edge seams 15 are only set at places where as a result of a respectively small angle $\alpha$ between the edge progress 14 and the direction of the fiber strands 2, 3 there is a likelihood of fraying during the subsequent handling of the cutting 13. This angle $\alpha$ depends on the structure of the merchandise and can generally be limited with 30°, so that an edge progress under an angle of 45° to the fiber strands 2, 3 does not require any edge seam, as is indicated in the drawing. However, the corner regions need to be provided with stitched seams because there is a likelihood of fraying in the corner regions even at larger angles $\alpha$.

What is claimed is:

1. A method of cutting out a blank having edges from an endless woven fabric comprised of weft and warp fiber strands, which comprises the steps of conveying the endless woven fabric in a conveying direction step by step in consecutive longitudinal sections, sewing a seam in the endless woven fabric exclusively inside, and along a part of, the edges and then cutting along the edges in a respective one of the consecutive longitudinal sections, and then advancing the endless woven fabric to the longitudinal section next to the one longitudinal section, the endless woven fabric being sewed and cut in at least two of the longitudinal sections.

2. The method of claim 1, wherein the seam is sewed in the part of the edges forming a corner of the blank.

3. The method of claim 1, wherein the seam is sewed in the part of the edges enclosing an angle smaller than 30° with the fiber strands at the edges of the blank.

* * * * *